(12) United States Patent
Liao (10) Patent No.: US 7,621,375 B2
(45) Date of Patent: *Nov. 24, 2009

(54) PNEUMATIC GREASE APPLICATOR (75) Inventor: Lin Po Liao, Taichung (TW)

(73) Assignee: Lih Yann Industrial Co., Ltd., Taichung (TW)

( * ) Notice: Subject to any disclaimer, the term of this patent is extended or adjusted under 35 U.S.C. 154(b) by 486 days.

This patent is subject to a terminal disclaimer.

(21) Appl. No.: 11/490,186

(22) Filed: Jul. 21, 2006

(65) Prior Publication Data

US 2008/0017449 A1    Jan. 24, 2008

(51) Int. Cl.
*F16C 1/24* (2006.01)
(52) U.S. Cl. .................... 184/5.1; 184/105.2
(58) Field of Classification Search ............. 184/105.1, 184/105.2
See application file for complete search history.

(56) References Cited

U.S. PATENT DOCUMENTS

| | | | | |
|---|---|---|---|---|
| 1,515,240 A | * | 11/1924 | Cox | 222/86 |
| 5,709,284 A | * | 1/1998 | Shultz, Sr. | 184/5.1 |
| 5,782,318 A | * | 7/1998 | Ng | 184/5.1 |
| 6,561,316 B1 | * | 5/2003 | Graf et al. | 184/38.4 |
| 6,920,961 B2 | * | 7/2005 | Ploeger | 184/105.1 |

* cited by examiner

*Primary Examiner*—Robert A Siconolfi
*Assistant Examiner*—James K Hsiao
(74) *Attorney, Agent, or Firm*—Muncy, Geissler, Olds & Lowe, PLLC (57) ABSTRACT

Disclosed is a pneumatic grease applicator includes a receptacle in which a retainer that forms a tubular axle selectively fit into a bearing to which grease is to be applied and a presser that defines a bore fit over the axle are movably received. The presser forms a top cavity in which a nozzle for coupling an external grease source is fixed. Grease is pneumatically supplied through the nozzle into the tubular axle and discharge through radially-extending holes defined in the axle to cover the bearing fit on the axle. An air vent is formed in the presser for pressure balance. Sealing members are provided between side wall of the receptacle and both the retainer and the presser to prevent leakage of grease.

6 Claims, 9 Drawing Sheets

PNEUMATIC GREASE APPLICATOR

BACKGROUND OF THE INVENTION

1. Field of the Invention

The present invention relates generally to a grease applicator that is employed to apply grease to mechanical elements, such as a bearing, and in particular to a pneumatically operated grease applicator in which grease is supplied and driven to cover over the bearing by pneumatic force.

2. The Related Art

Figure 1:
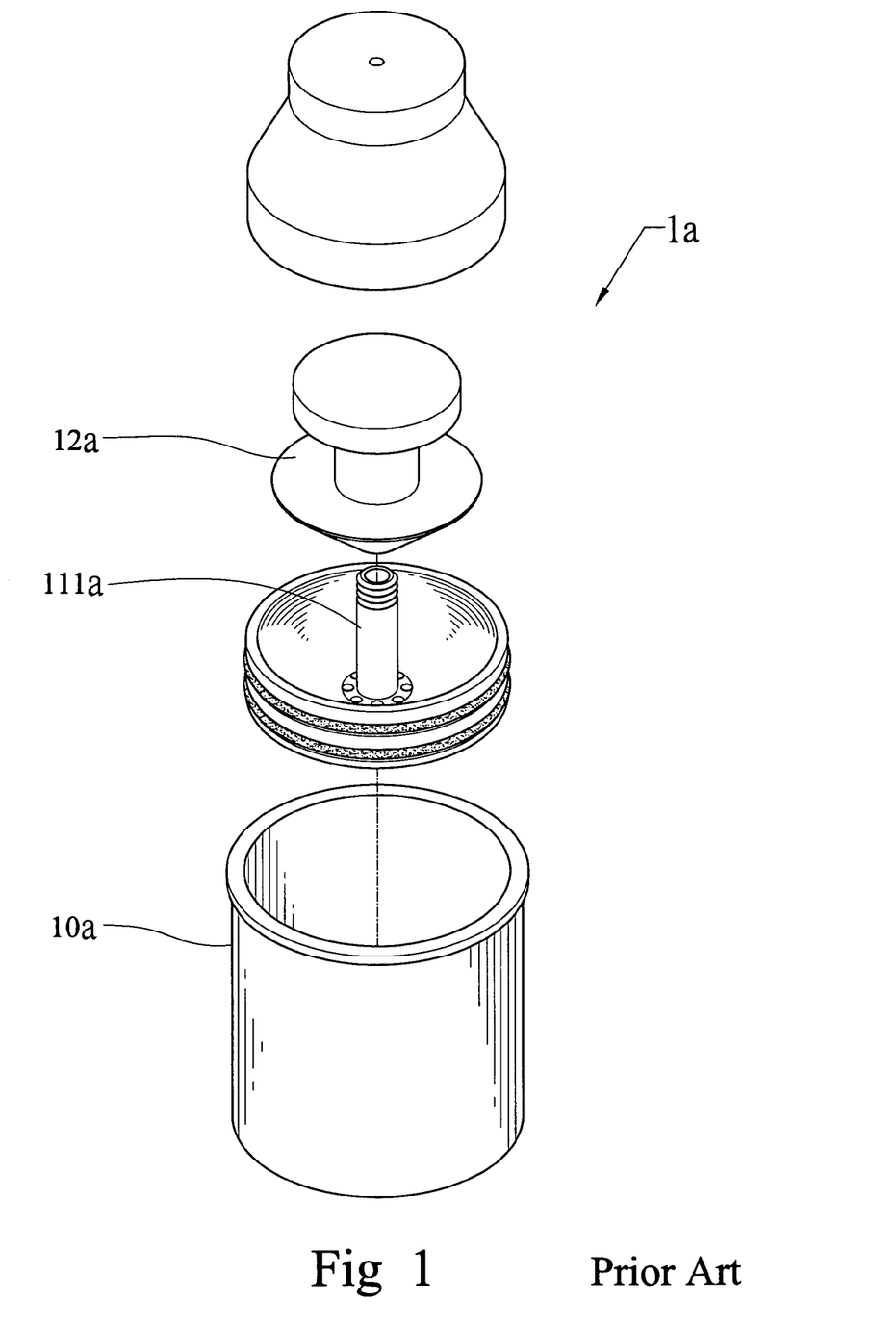
FIG. 1 is an exploded view showing a conventional grease applicator.

Industrial applications of bearings, for example heavy machinery, such as trucks and automobiles, require the bearings be uniformly coated with grease for lubrication purposes. Conventionally, the application of grease to bearings is done manually. In other words, workers apply grease to bearings by bear hands or hands with gloves. Since grease is a viscous substance, the application of grease to bearings is difficult, and often resulting in contamination of working site or the clothes and body of the worker by being unexpected or accidentally contacted by the workers' hands. Grease applicators are available in the market for addressing the drawback, and an example of the conventional grease applicator is shown in FIG. 1 of the attached drawings, and designated with reference numeral 1a.

The conventional grease applicator, although effectively in applying grease to bearings, suffers the following drawbacks:

(A) The operation of the conventional grease applicator is based on the amount of grease fed in a grease receptacle 10a (see FIG. 1) of the applicator, and such an amount is limited due to the limited capacity of the receptacle. Once the grease is consumed up, the operation of applying grease must be interrupted and a presser 12a be removed for re-filling grease into the receptacle 10a. The pressure 12a is then mounted back to a retainer of the receptacle 10a after the replenishment of grease. Such repeated disengagement/engagement of the retainer and the presser 12a is quite likely to cause undesired contamination both inside and outside the receptacle 10a. Further, the requirement for frequent replenishment of grease makes it impossible to consecutively apply grease to a number of bearings.

(B) A tubular axle 111a formed on the retainer for replenishing grease must take the pressure of grease filling into the receptacle 10a and also needs to take the driving force acting thereon by the presser 12a during the application of grease. The tubular axle 111a is thus often in a pressed condition, which makes the tubular axle 111a fatigue and thus easily broken.

(C) Clearance or gap is present between the side wall of the receptacle 10a and the presser 12a, which causes severe leakage of grease out of the receptacle. Substantial replenishment of grease is required during the operation of the grease applicator. This means a great waste of grease.

(D) The operator must continuously apply a pressure to the presser with his or her hand. This often causes fatigue of the operator's hand and lowers the operation efficiency.

Figure 2:
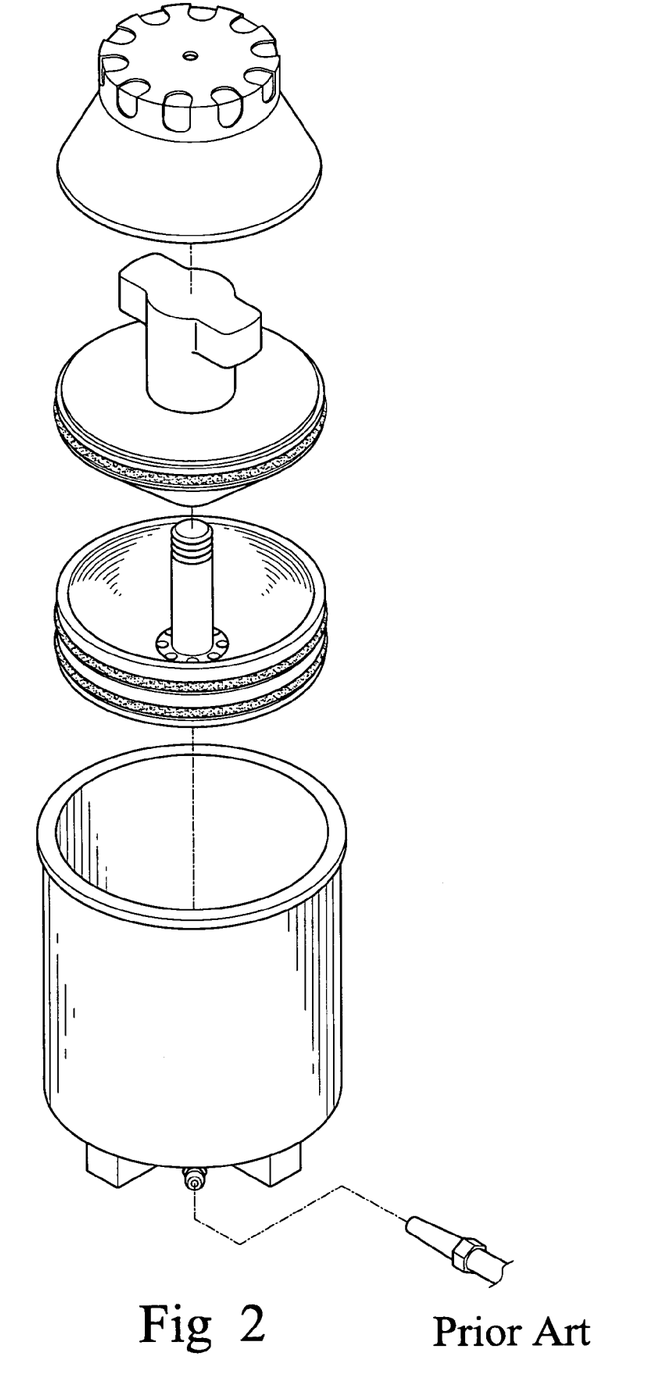
FIG. 2 is an exploded view showing a conventional pneumatic grease applicator.
Figure 3:
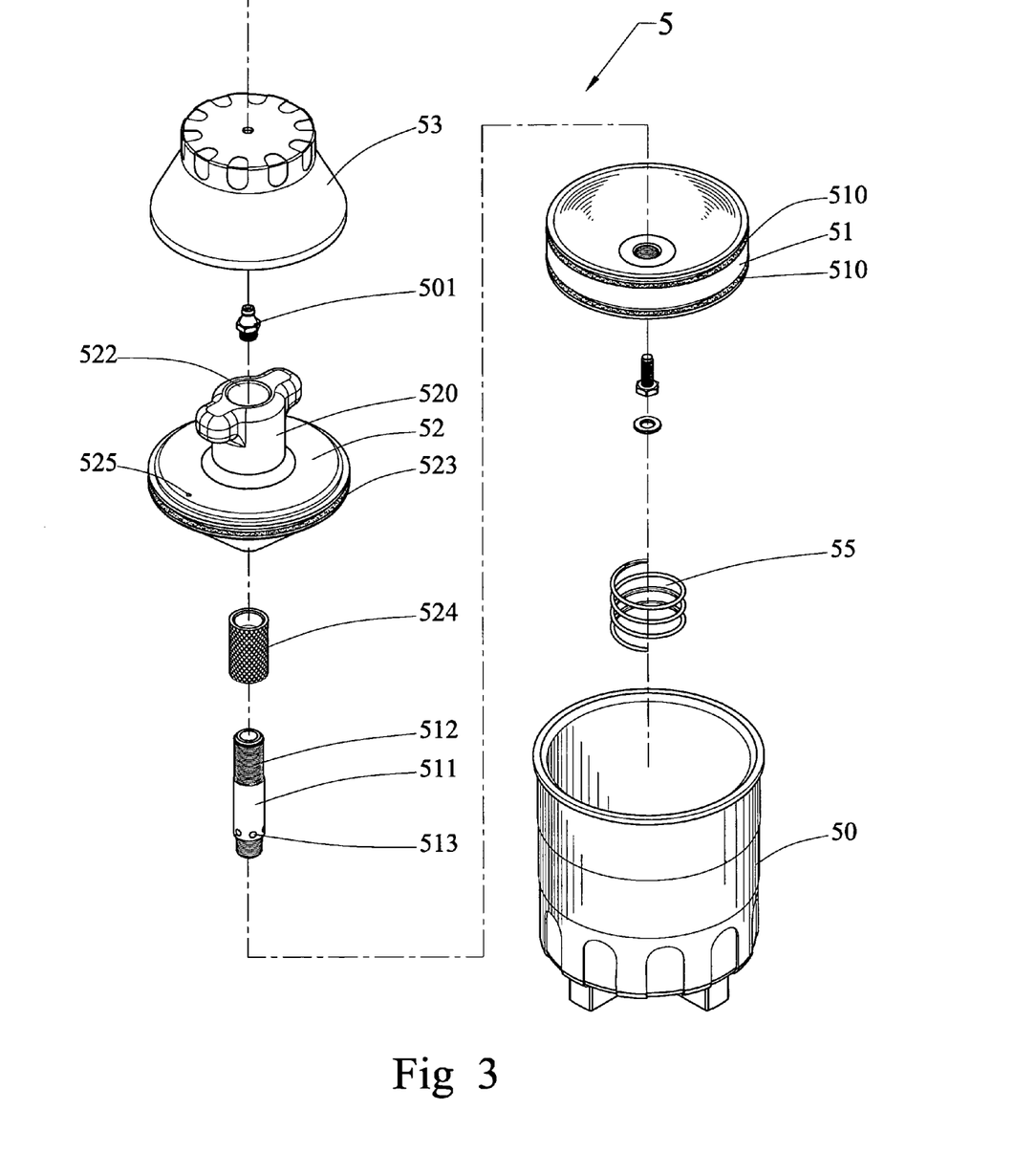
FIG. 3 is an exploded view showing a pneumatic grease applicator constructed in accordance with the present invention.
Figure 4:
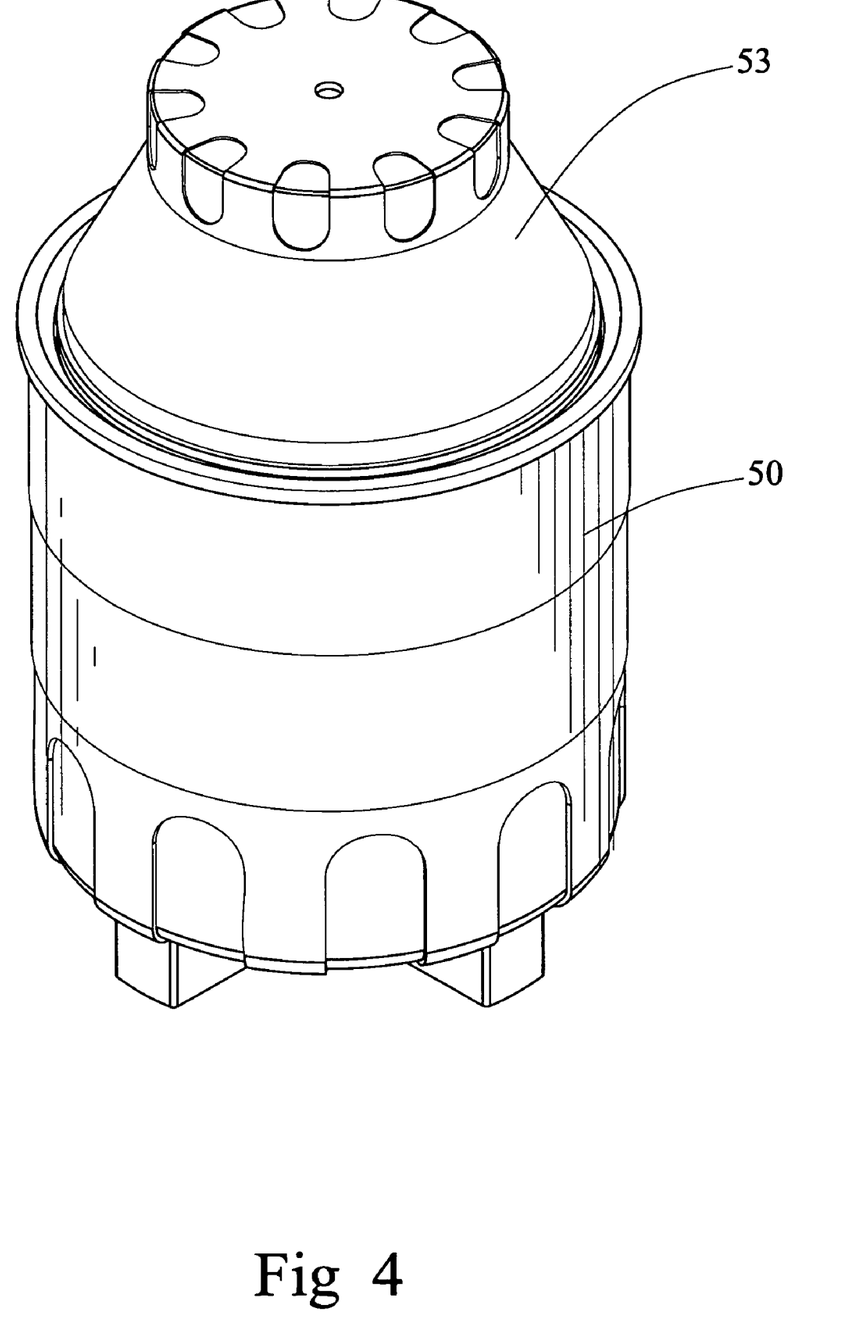
FIG. 4 is a perspective view of the pneumatic grease applicator of the present invention.
Figure 5:
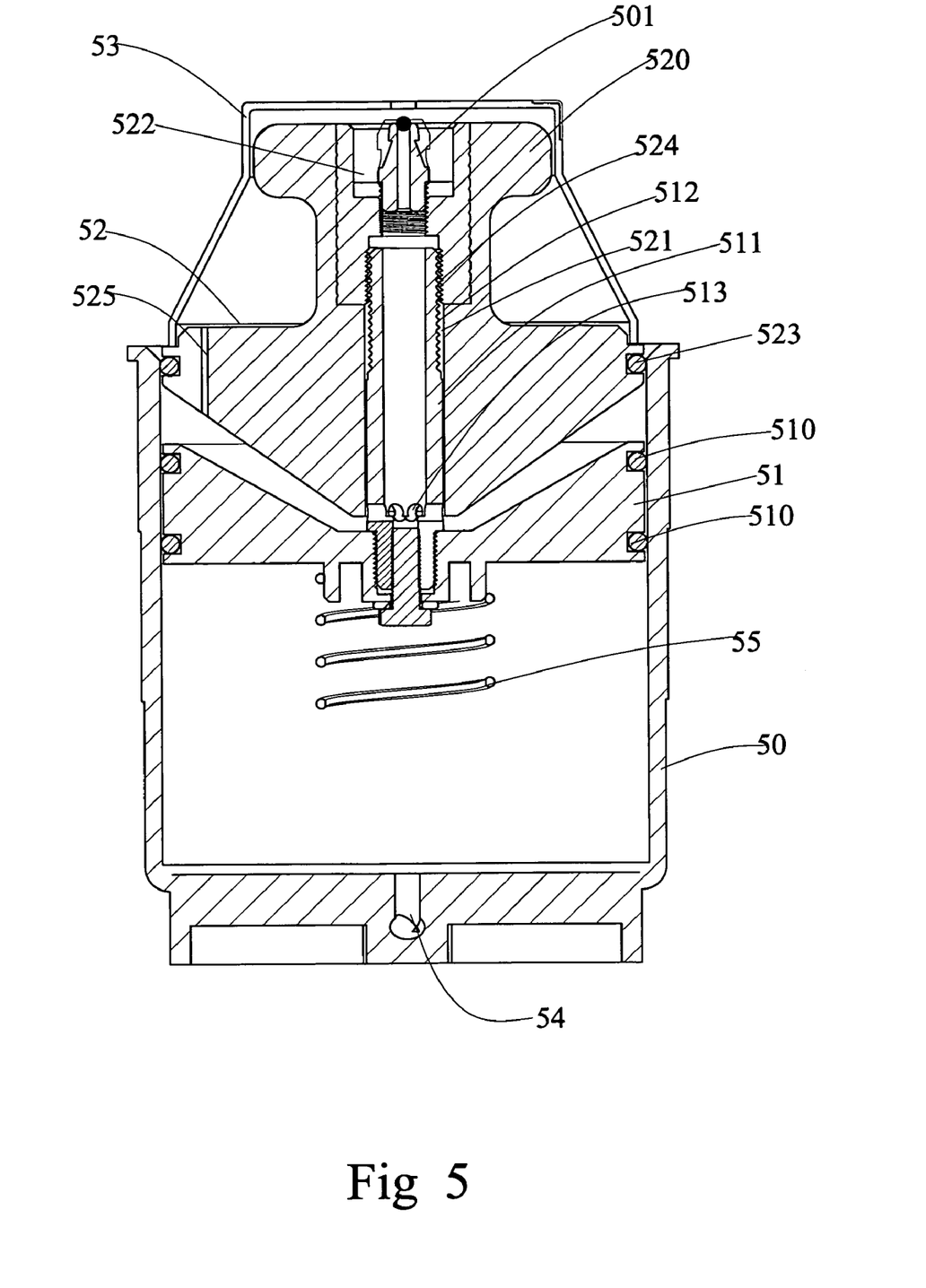
FIG. 5 is a cross-sectional view of the pneumatic grease applicator of the present invention.
Figure 6:
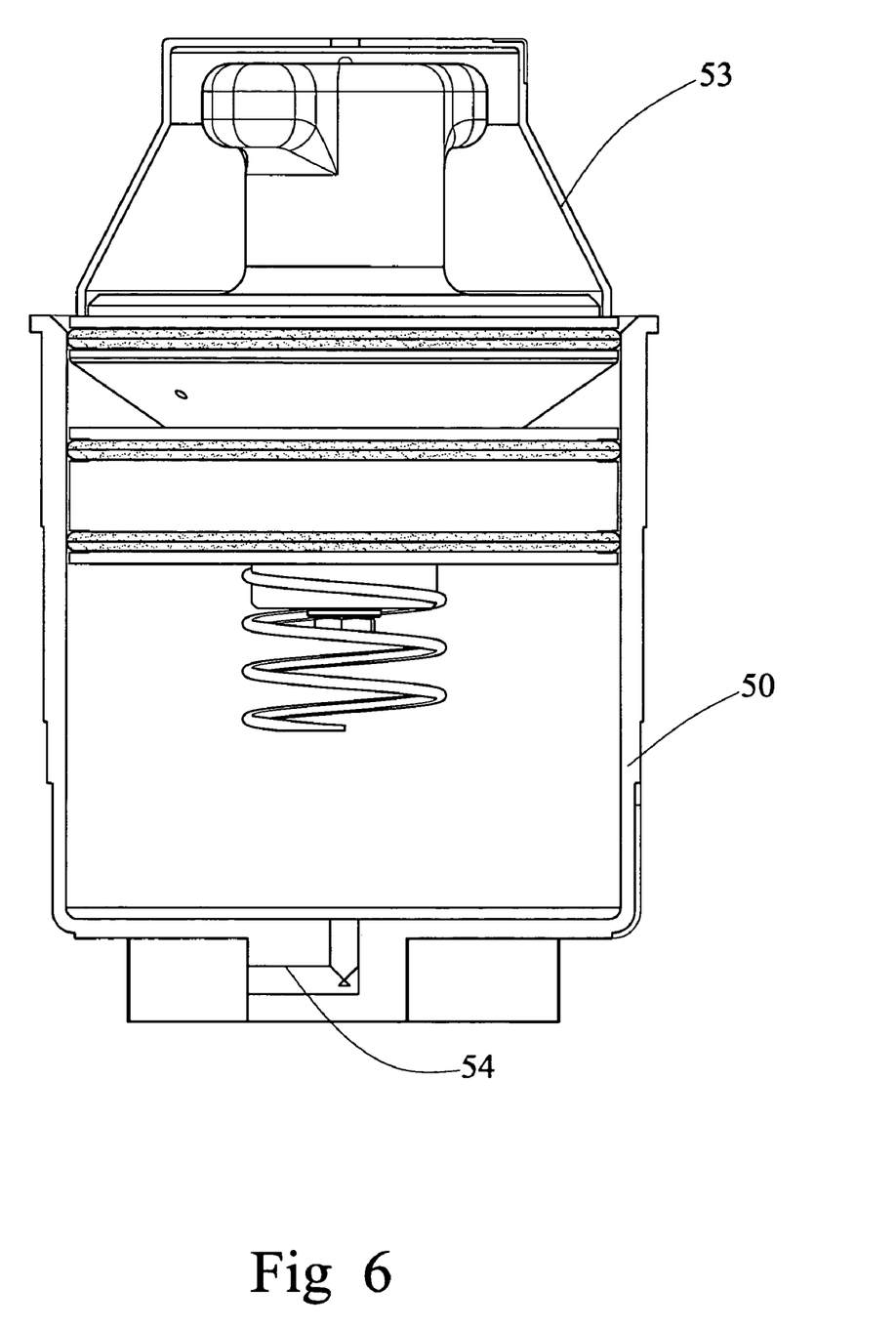
FIG. 6 is a side elevational view, partially broken, of the pneumatic grease applicator of the present invention.

U.S. patent application Ser. No. 11/189,708, as illustrated in FIG. 2 of the attached drawings, which is also invented by the present inventor, provides a pneumatic grease applicator that overcomes the above discussed drawbacks of the conventional grease applicator. However, further improvement is desired to provide an even more advanced and efficient grease pneumatic applicator.

SUMMARY OF THE INVENTION

Thus, the present invention is aimed to provide a grease applicator that is easy to operate for efficiently applying grease to mechanical parts.

The present invention is to provide a grease applicator that is pneumatically operable for uniformly and efficiently applying grease to bearings.

The present invention provides a grease applicator that is completely grease leakage-proof and is thus free of contamination caused by grease.

To realize the above objectives, in accordance with the present invention, there is provided a pneumatic grease applicator comprising a receptacle in which a retainer that forms a tubular axle selectively fit into a bearing to which grease is to be applied and a presser that defines a bore fit over the axle are movably received. The presser forms a top cavity in which a nozzle for coupling an external grease source is fixed. Grease is pneumatically supplied through the nozzle into the tubular axle and discharge through radially-extending holes defined in the axle to cover the bearing fit on the axle. An air vent is formed in the presser for pressure balance. Sealing members are provided between side wall of the receptacle and both the retainer and the presser to prevent leakage of grease.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

With reference to the drawings and in particular to FIGS. 3-6, a pneumatic grease applicator constructed in accordance with the present invention, generally designated with reference numeral 5, comprises a grease receptacle 50, a bearing retainer 51, a presser 52, and a dust cover 53. The receptacle 50 comprises a container having a top opening and a closed bottom. The bottom of the receptacle 50 defines an air vent passage 54.

The bearing retainer 51 is movably received in the receptacle 50 via the top opening and has a bottom face opposing and spaced from the closed bottom of the receptacle 50. A resilient member 55, such as a helical spring, is mounted to the bottom face of the bearing retainer 51 and is movable with the bearing retainer 51 inside the receptacle 50 to have a lower end of the resilient member 55 engaging the closed bottom of the receptacle 50. The retainer 51 also has an opposite top face in which a truncated conic recess (not labeled) having a flat central bottom is defined.

An axle 511, which forms a central bore (not labeled), is mounted to and extends upward from the flat central bottom of the truncated conic recess of the retainer 51. In the embodiment illustrated, the flat central bottom of the truncated conic recess of the retainer 51 concentrically forms an inner-threaded hole engageable with a lower externally-threaded end section of the axle 511 to fix the axle 511 to the retainer 51. The axle 511 also forms external threading 512 on an upper end section thereof.

A plurality of radially-extending holes 513 is defined in the axle 511, preferably in an equally spaced manner, at a location close to the lower threaded end section of the axle 511. The holes 513 are in fluid communication with the central bore of the axle 511 to serve as grease passages.

The retainer 51 has a circumferential side surface connecting the top and bottom faces of the retainer 51 and opposing an inside surface of a side wall of the receptacle 50. At least one sealing member 510 is mounted to the circumferential side surface of the retainer 51 and form grease-tight engagement with inside surface of side wall of the receptacle 50 to eliminate leakage of grease through the clearance between the retainer 51 and the side wall of the receptacle 50.

In the embodiment illustrated, the presser 52 has an inverted cone-shaped body having a conic bottom corresponding in both location and size to the truncated conic recess of the retainer 51, but not necessary to be so, and an opposite top on which a projection 520 is formed, preferably in a concentric manner. The presser 52 is received in the receptacle 50 and located above the retainer 51 with the conic bottom thereof opposing the truncated conic recess of the retainer 51.

The presser 52 defines, in the conic bottom thereof, a bore 521 into which the axle 511 is movably fit. An inner-threaded sleeve 524 is tightly fit in the bore 521 to engage the external threading 512 of the axle 511. At least one sealing member 523 is mounted to a circumferential surface of the presser 52 to form a grease-tight engagement with the inside surface of the side wall of the receptacle 50 in order to prevent grease from leaking through a potential gap between the presser 52 and the side wall of the receptacle 50.

The presser 52 defines, in the projection 520 thereof, a cavity 522, which is concentric with and communicates the bore 521. A nozzle 501 is received and fixed in the cavity 522, preferably by threading coupling, and in fluid communication with the bore 521. The nozzle 501 serves to selectively couple with a pneumatic grease gun 6 (see FIG. 7).

An air vent 525 is formed in the presser 52 and extends from the conic bottom to the top for air ventilation between a space delimited by the presser 52 and the retainer 51, and the surroundings.

Figure 7:
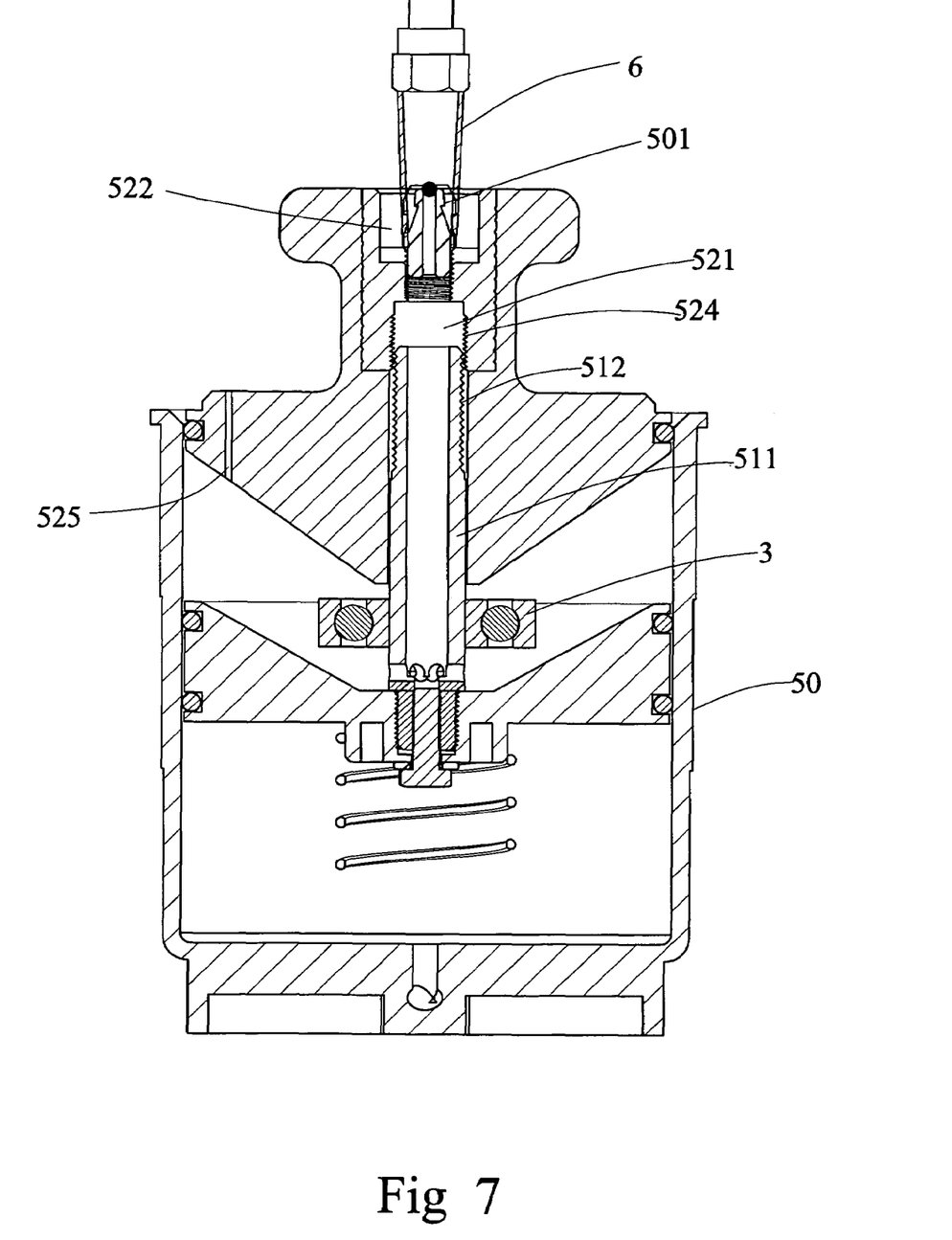
FIG. 7 is a cross-sectional view of the pneumatic grease applicator of the present invention in an operation condition by being connected to a grease gun for filling grease into the grease applicator.
Figure 8:
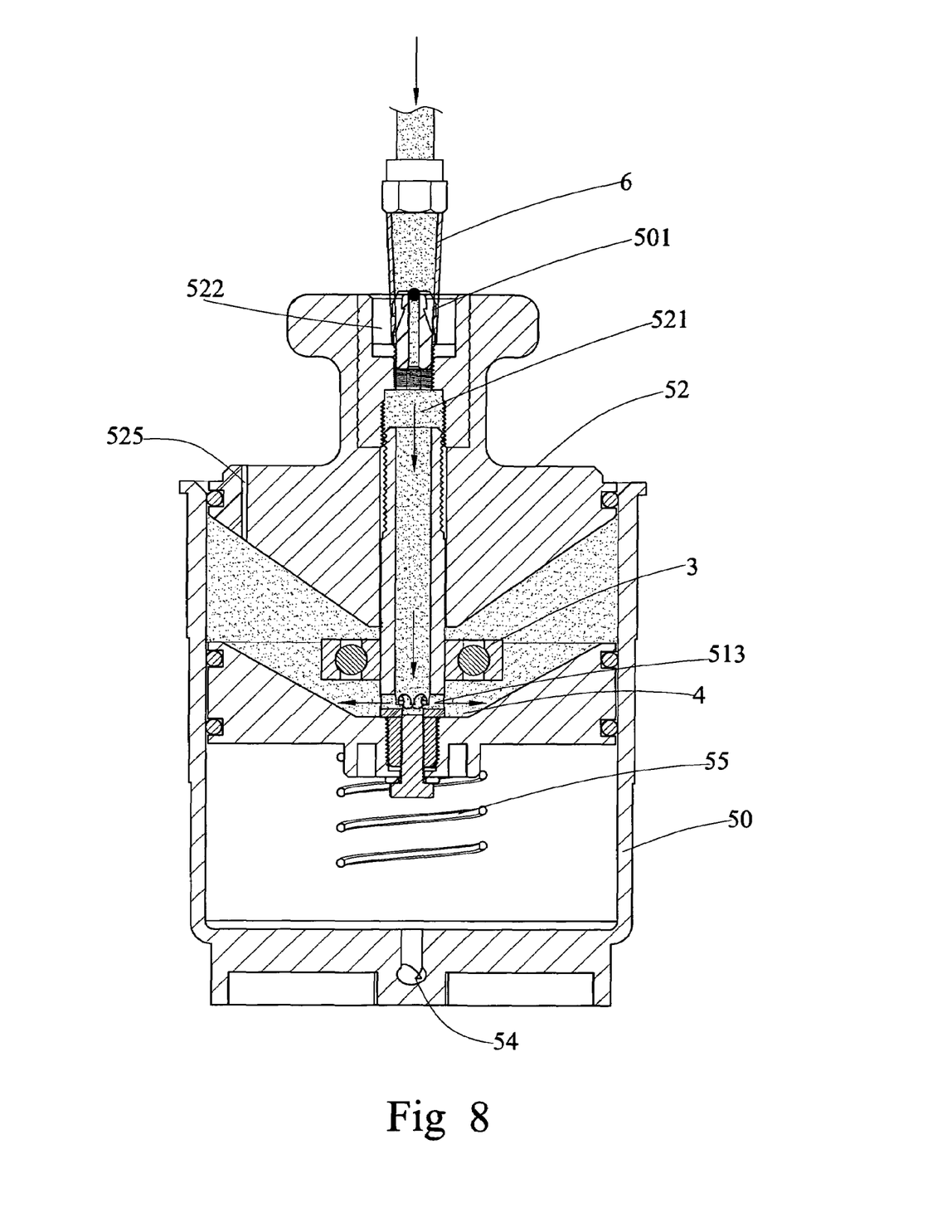
FIG. 8 is a cross-sectional view similar to FIG. 7, illustrating the supply of grease into the grease applicator.
Figure 9:
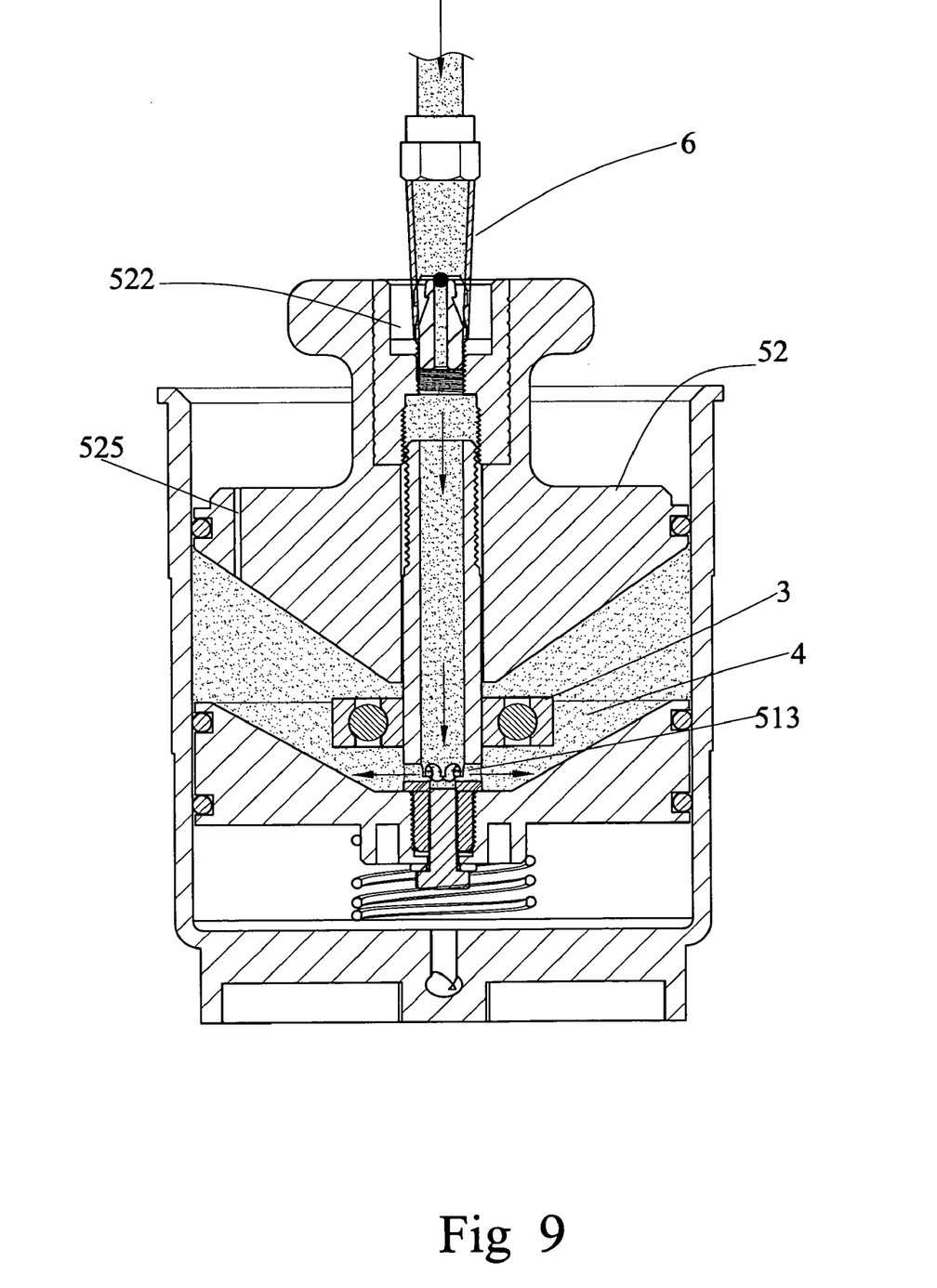
FIG. 9 is a cross-sectional view of the grease applicator illustrating the operation of the grease applicator.

Also referring to FIGS. 7-9, to operate, with the presser 52 removed out of the receptacle 50, a bearing, which is labeled by reference numeral 3 in FIGS. 7-9, is fit over the axle 511 of the retainer 51 and is thus deposited into the receptacle 50 and received in the conic recess of the retainer 51. The grease gun 6 is coupled to the nozzle 501 that is fixed in the cavity 522 of the presser 52 and the presser 52 is put back into the receptacle 50 with the bore 521 of the presser 52 fit over the axle 511 and the internal threading of the sleeve 524 of the bore 521 engaging the external threading 512 of the axle 511 to retain the bearing 3 between the presser 52 and the retainer 51, as shown in FIG. 7.

The grease gun 6 is then operated pneumatically to supply grease, which is labeled with reference numeral 4 in FIGS. 8 and 9, into the central bore of the axle 511 via the nozzle 501. The grease fed into the central bore of the axle 511 flows through the radially-extending holes 513 into the space defined between the presser 52 and the retainer 51, where the bearing 3 is retained. Once a sufficient amount of grease 4 is supplied into the space, the grease 4 fills up the space between the retainer 51 and the presser 52 so as to completely surround the bearing 3. As a consequence, the bearing 3 is uniformly applied with the grease 4, as shown in FIGS. 8 and 9.

The dust cover 53 is selectively and removably mounted to the top opening of the receptacle 50 to prevent dust and foreign objects from getting into and thus contaminating the interior of the receptacle 50.

To this point, it is apparent that the pneumatic grease applicator 5 of the present invention possesses the following advantages:

(A) The pneumatic grease applicator allows for direct replenishment of grease through the top of the presser so that no pre-filling of a large amount of grease in the receptacle is needed before operation is started.

(B) The grease is fed in a pneumatic manner and is supplied into the pneumatic grease applicator through radially-extending holes so that the application of grease to a bearing can be done in a more efficient and uniform manner.

(C) Since the grease is supplied pneumatically, no hand holding and pressing the presser is needed, which makes the operation easy and effortless.

(D) Grease cannot easily get out of the receptacle and undesired contamination caused by the leaking grease is eliminated.

Although the present invention has been described with reference to the preferred embodiment with reference to the drawings thereof, it is apparent to those skilled in the art that a variety of modifications and changes may be made without departing from the scope of the present invention which is intended to be defined by the appended claims.

What is claimed is:

1. A pneumatic grease applicator, comprising:
a grease receptacle formed by a side wall having a top opening and a closed bottom;
a bearing retainer movably received in the receptacle through the top opening and having a top face forming a recess adapted to receive an object on which grease is to be applied, an axle mounted in the recess and having a threaded upper end section, the axle defining a central bore and a plurality of grease passages in communication with the central bore, at least one sealing member being mounted on a circumference of the retainer to form grease tight engagement with the side wall of the receptacle;
a presser movably received in the receptacle through the top opening and located above the retainer, the presser having a low portion corresponding to the recess of the retainer, the lower portion defining a hole movably fit over the axle and forming internal threading to engage the threaded end section of the axle, at least one sealing member being mounted to a circumference of the presser to form grease tight engagement with the side wall of the receptacle, the presser having a top portion forming a cavity in which a nozzle adapted to couple a grease gun is received and fixed, the nozzle being in fluid communication with the hole of the lower portion of the presser, and thus the central bore of the axle fit into the hole of the lower portion of the presser, an air vent being defined in the presser;

a nozzle mounted to a channel defined in the bottom of the receptacle and in communication with the first space, the nozzle being adapted to connect with a pneumatically driven grease supply source to forcibly feed grease into the first space through the nozzle and the channel and to force the grease into the second space through the grease passages to flood over the object and thus applying grease to the object.

2. The pneumatic grease applicator as claimed in claim 1, wherein the bottom of the receptacle forms an air vent.

3. The pneumatic grease applicator as claimed in claim 1, wherein the grease passages of the axle comprise radially-extending holes defined in the axle and in fluid communication with the central bore of the axle.

4. The pneumatic grease applicator as claimed in claim 1, wherein the recess is of a truncated conic shape having a central flat bottom from which the axle extends, and wherein the lower portion of the presser is inverted cone-shaped.

5. The pneumatic grease applicator as claimed in claim 1 further comprising a dust cover for selectively closing the top opening of the receptacle.

6. The pneumatic grease applicator as claimed in claim 1 further comprising a resilient member mounted to a bottom of the retainer to selectively engage the bottom of the receptacle.

* * * * *